Feb. 22, 1966   P. J. RIEPPEL ETAL   3,236,547
WELDED JOINT

Original Filed July 5, 1959

Perry J. Rieppel
Glenn E. Faulkner
Jerome W. Nelson
Harry C. Cook

INVENTORS

BY  *Edwin M. Thomas*

ATTORNEY

United States Patent Office 3,236,547
Patented Feb. 22, 1966

3,236,547
WELDED JOINT
Perry J. Rieppel, Worthington, and Glenn E. Faulkner and Jerome W. Nelson, Columbus, Ohio, and Harry C. Cook, Orange, N.J., assignors, by direct and mesne assignments, to Esso Research and Engineering Company, a corporation of Delaware
Original application July 5, 1959, Ser. No. 825,159, now Patent No. 3,084,246, dated Apr. 2, 1963. Divided and this application Aug. 14, 1962, Ser. No. 216,792
4 Claims. (Cl. 285—286)

This application is a division of Serial No. 825,159, filed July 5, 1959, now Patent Number 3,084,246. The parent application was concerned with a process for forming welded joints between pipes and other metal shapes and also with apparatus for carrying out such a process.

The present invention relates to an improved welded joint. It relates more specifically to circumferential welds used particularly in pipelines and analogous structures. In its broader aspects, it can be used in out-of-position welding and in some of its aspects it can be applied in joining the edges of flat or curved plates to form butt joints in various positions.

As one of its more important applications, the weld will be described especially with reference to welded joints in steel pipe, such as is used in pipelines for transmission of natural gas and petroleum products. The invention, of course, has other applications as well.

In the prior art, various suggestions have been made for automatic or semiautomatic welding of butt joints in pipes and other structures. Generally speaking, however, the prior proposed automatic apparatus and methods are too slow and have not been satisfactory or have at least required considerable manual work or large, cumbersome auxiliary equipment to supplement the machine welding. As a general rule, pipelines have been welded by abutting the pipe ends, previously machined to a bevel which forms a groove to be filled with welding material. This is usually done by clamping the joint internally or externally to hold the pipe sections in proper abutting relation for the welding operation and applying the welding material by means of a manually controlled electric arc. The weld metal in the prior art process is applied in small increments to fill the V-groove of about 60° to 75° angle, this angle being determined when the pipe ends are machined prior to assembly in the pipeline. This type of welding has usually been accomplished first by tacking with small pools or globlules of molten weld metal and is then carried on piecemeal in a series of manual operations. It requires considerable operative skill as well as much time and material to do an acceptable job. Some of the welds made by such prior methods tend to be rough and uneven in appearance, and may contain cavities, flaws and other faults.

Primary objects of the present invention are to provide a welded joint which can be made rapidly, especially in large pipes which cannot be rotated, by forming carefully controlled, uniformly sized gaps or spaces between the parts to be welded and then filling these gaps. Another object is to provide a welded joint which has been evenly filled in a single pass operation. Another is to achieve a welded joint having a high degree of uniformity in weld quality and strength and having no deformities of the joint due to shrinking and other forces as the welding is being accomplished.

Specific objects are the following, although the invention is not limited thereto, as indicated above:

(A) To provide a satisfactory single pass welded joint especially in plate and pipe of ¼ to ⅜ inch thickness in all positions, e.g. in pipe-welding a welded joint made uniformly in a single pass at the top, sides and bottom of a nonrotated pipe.

(B) To provide a welded joint having an unusually narrow cross sectional width, usually produced by a single pass operation, where the actual joint (or gap) depth to width ratio is from about 3 to 7:1 (preferably 4.5 to 6.5:1), and where the fusion zone depth to width ratio is of the general range of 2 to 1 or more.

(C) To provide a welded joint of unusual but highly desirable fusion line geometry, especially for single-pass welds. The welded joint is made by using continuously fed welding wire. The fusion zone narrows under the wire burn-off position but flares out at the root due to superheated metal under the arc, thus melting back at the root edges; this ensures good root fusion.

(D) To provide an efficient and economical welded joint which can be formed by a welding action obtained by the proper combination of welding variables (traverse rate, weld wire feed, gap width, electric potential and current, etc.) in a well controlled and substantially automatic process.

(E) To provide a welded joint having an unusual texture and high strength which is made by an essentially single pass operation in a deep, narrow, vertical, or perpendicular walled gap.

Still more specific objects will appear from a detailed description of the welded joint which follows:

The welded joint may be used for straight or flat welds of abutting members, e.g. joints or seams in flat and curved plates as well as for welding together the ends of adjoining pipe sections. Flat or curved plates and sheets may be welded in various positions and from various directions, vertical, horizontal, overhead or otherwise.

The welded joint of the present invention has the important advantage of wide flexibility. It can be prepared in high quality by the use of reasonable amounts of equipment at rates which can keep up with high speed pipe laying practices in the field and at substantially reduced cost. The joint consistently has adequate tensile strength and ductility, equivalent to or greater than that of the basic pipe metals. It can be made by using smaller amounts of welding rod or wire and by a process which will more easily protect it from variations in amounts of welding rod or wire and by a process which will more easily protect it from variations in weather and other ambient conditions than prior art methods.

Referring now to the drawings.

Figure 1:
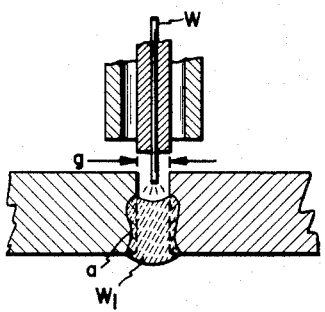
FIGURES 1 and 2 are sectional sketches showing important details or critical dimensional relationships in welds of the type under consideration.

In FIGURE 1, the space between the pipe ends has been precisely determined, e.g. where cutting is used the joint has been cut through cleanly and the weld must fill a uniform (in width) gap from bottom to top. When this gap $g$ is carefully controlled in width and uniformity, an essentialy smooth bottom and top surface may be produced. As the gap is filled, the molten weld wire, and metal which is melted off the pipe ends by the heat of the arc, fuses with the pipe progressively as indicated at $W_1$. The heat of the arc is of greatest intensity around the end of the wire W, about the middle of the pipe wall thickness. Adjoining pipe wall metal is fused here and flows inwardly and outwardly to melt the root edges of the pipe. This gives the characteristic weld cross section of this joint which is a distinctive and important feature of the present invention.

Where the spacing of smoothly finished pipe end sections can be accurately controlled and when they can be adequately clamped to preserve an accurate space between the butt ends, cutting is not necessary. It must be emphasized, however, that the width of the gap all around the pipe must be held within close tolerance limits, e.g. limits of 0.003" to 0.005" plus or minus, all the way around the pipe circumference or good welding cannot be accomplished by single pass operation. If maintenance of gap tolerance cannot be effected by simple clamping, then the cutting must precede the welding to obtain first quality single pass welds.

Figure 2:
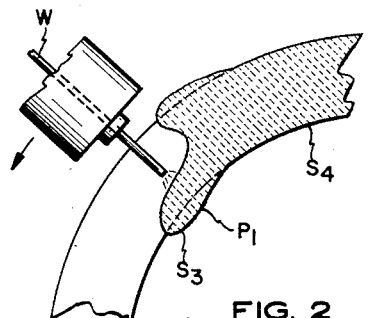

Referring to FIGURE 2, the flow of metal in a counterclockwise welding traverse is shown. The wire W is fused and forms, together with metal melted from the pipe, the pool $P_1$ which tends to sag in a meniscus as indicated at $S_3$. However, the metal adjoining the weld extracts heat from the pool very rapidly as the welding arc moves on, causing shrinkage. The middle part of the pipe wall thickness conducts more heat away than the portions near the inner and outer surfaces, but the whole molten mass shrinks as it cools and solidifies. This shrinkage, plus the surface tension of the sagging metal meniscus, tend to straighten up the inner surface, as indicated at $S_4$. Hence, a substantially flush surface is formed inside the pipe. The corner fusion at the root or inside surface of the weld is a particularly important feature. See FIGURE 7. It is due to reduced conduction by the pipe material of heat away from the joint as compared to conduction at the middle of the wall thickness.

Figure 3:
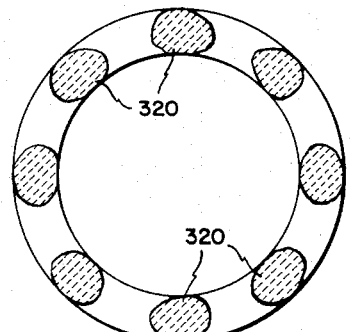
FIGURES 3, 4, 5 and 6 show diagrammatically specific aspects and modifications of the welded joint as applied to circumferential or girth welds.
Figure 4:
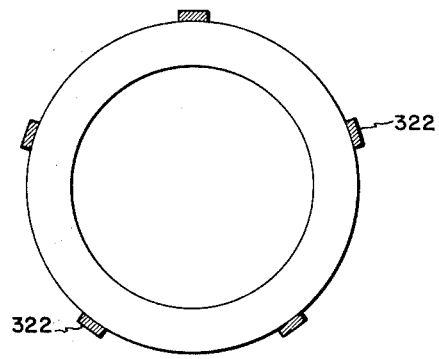

In practice, the welded joint may be made in several different ways. Under some conditions, it is preferred first to tack the abutting pipe ends together as shown in FIGURE 3 at 320. Tacking may be accomplished also with spaced welded connections between the abutting ends by means of bridging bars 322, attached as indicated in FIGURE 4. These hold the gap width constant despite forces set up by shrinkage of the main welding material $W_1$; see FIGURE 1.

Figure 5:
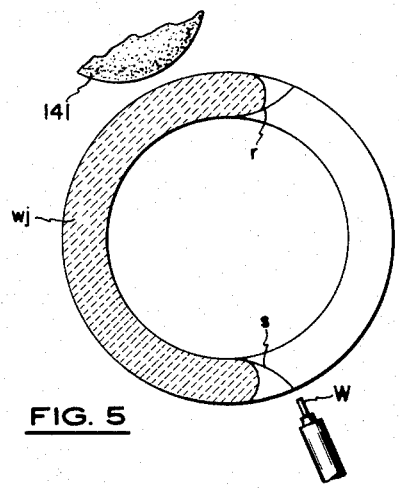
Figure 6:
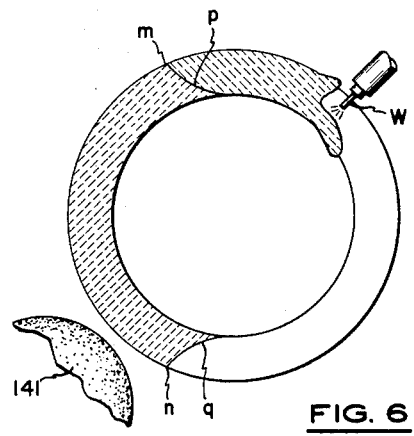

The production of the full welded girth joint may also be accomplished in two major operations as shown by FIGURES 3 to 6, especially FIGURES 5 and 6. In a typical operation, the cutting wheel 141 is first swung into contact with and cuts through the wall thickness the joint at the top of the pipe. The cutter is then rotated down one side through approximately 180° around the pipe. Assume, for example, that the joint is first cut around the left half of FIGURE 5 and is subsequently welded. This is accomplished by first swinging the cutter 141 into operation to cut through the pipe wall thickness, and then the cutter is moved counterclockwise from top to bottom; secondly, the welding unit is brought into operation and rotated, also downwardly, from the top in counterclockwise direction to provide the shaded welded joint $wj$ about half way around the pipe as shown at the left of FIGURE 5.

Referring now to FIGURE 6, the weld is completed by first bringing the cutter down in the approximate position to cut through to the line $m$, $p$ of FIGURE 6 and then swinging it clockwise, while cutting, from point $m$ to point $n$. This operation, it will be observed, rounds out an arcuate cut or ramp indicated at $p$ and ends by leaving a smooth arcuate ramp surface $q$ at the bottom.

These ramp surfaces $p$ and $q$ are ideally suited for the second half of the weld since the weld metal flows in smoothly at the top; and as the welder swings to the right or clockwise, the joint is filled in such a manner that gravity assists in obtaining smooth flow. At the bottom as the weld is finished gravity tends to flow the molten metal along the surface $q$ so as to form a flawless weld in the two operations. By contrast, voids tend to be formed as indicated at $r$ and $s$, FIGURE 5, if the end portions of the first half circumfgerence weld are not cut out to put them in workable shape.

Figure 7:
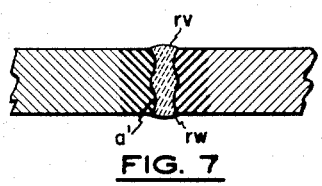
FIGURE 7 is a detailed fragmentary sectional view of a finished weld typical of those included in the present invention.

FIGURE 7 shows an example of the cross section of a very good weld. Even with the fusion of the adjoining pipe metal, the whole weld still is very narrow; it has a depth to width ratio of about two to one. Such configuration not only minimizes use of welding wire but gives strong smooth joints of execellent quality.

In contrast to other welded joints, the present weld is made in a single pass to give an excellent weld cross section. Sections taken from actual welds show the characteristic shape for the weld itself and the heat treated area adjoining as FIGURE 7 shows. High speed motion pictures which have been taken show that the heat of the arc apparently reaches its greatest intensity about the middle of the wall thickness, where the consumable electrode wire burns off. Wall fusion on both sides, plus the molten wire, provides the superheated molten pool of weld metal which the force of the arc pushes inwardly as well as laterally. This superheated weld metal fuses back the inner wall or root edges to give the weld cross section a characteristic flared shape at the inner wall with a narrower waist portion $a$, FIG. 1, or $a'$, FIG. 7, in between. Ideally, a generally similar shape $rv$ is achieved at the outer wall surface, as shown in FIG. 7, but the flared root weld $rw$, FIG. 7, is of greater practical importance than the similar structure $rv$ at the top or outside of the wall. The heat of the weld also heat-treats the metal of the pipe wall to give the generally rectangular penumbra effect adjoining the actual weld on both sides. This highly desirable weld formation is a superior feature of the invention.

It will be understood that many variations may be made in dimensions and other factors indicated above so long as their proper interrelationships and combinations are observed. It is intended to cover this and other obvious alternatives as broadly as possible, within the limits of the prior art, by the following claims.

We claim:

1. As an article of manufacture, a pair of metal pipe sections of essentially similar diameters and wall thickness, joined by fused weldment having a relatively wide weld cross section at the middle of the wall thickness, a flared cross section at the inner wall, and a narrower cross section than either the middle or the flared cross-sections at a point between said middle and said inner wall, said finished joint being substantially flush with the inner pipe wall.

2. Article according to claim 1 wherein the weld area is bounded by a heat treated area which is generally of rectangular cross section transverse to the line of weld wherein the fused weldment has a width less than the pipe wall thickness.

3. A pair of metal members having end surfaces of substantially equal thickness, said surfaces being flat and planar and disposed in opposite relationship in parallel closely adjacent planes to form a weldment receiving gap and a weldment joining said members together and filling said gap, the central portion of said weldment being fused more deeply into each of said members than at other points in the weld, said weldment also having a flared outer portion at at least one boundary of the original plane surfaces which is wider than the original weldment receiving gap, and a portion on each side of the central portion which is narrower in cross section than either the center or said at least one outer portion, the weldment also being substantially flush with original surfaces of the members at said flared outer portion.

4. A pair of metal members having a weldment according to claim 3 wherein there is a flared outer portion at both surfaces.

References Cited by the Examiner

UNITED STATES PATENTS

| | | | |
|---|---|---|---|
| 1,158,307 | 10/1915 | Schmid | 285—286 X |
| 1,457,183 | 5/1923 | Mitchell | 285—189 |
| 1,599,927 | 9/1926 | Stresau | 285—22 X |
| 1,615,686 | 1/1927 | Egschholz | 219—137 |
| 1,975,495 | 10/1934 | Armacost | 285—286 X |
| 1,980,561 | 11/1934 | Wagner | 285—286 X |
| 2,043,952 | 6/1936 | Efield | 29—498 X |
| 2,079,265 | 5/1937 | Trainer | 219—60 X |
| 2,141,021 | 12/1938 | Rooke et al. | 29—497 |
| 2,405,542 | 8/1946 | Wassell | 285—22 X |

FOREIGN PATENTS 425,336   3/1935   Great Britain.

CARL W. TOMLIN, *Primary Examiner.*